US006947916B2

(12) United States Patent
Luo et al.

(10) Patent No.: US 6,947,916 B2
(45) Date of Patent: Sep. 20, 2005

(54) IC FOR UNIVERSAL COMPUTING WITH NEAR ZERO PROGRAMMING COMPLEXITY

(75) Inventors: Fa-Long Luo, San Jose, CA (US); Bohumir Uvacek, Mountain View, CA (US)

(73) Assignee: Quicksilver Technology, Inc., San Jose, CA (US)

( * ) Notice: Subject to any disclaimer, the term of this patent is extended or adjusted under 35 U.S.C. 154(b) by 747 days.

(21) Appl. No.: 10/029,502

(22) Filed: Dec. 21, 2001

(65) Prior Publication Data

US 2003/0120363 A1 Jun. 26, 2003

(51) Int. Cl.[7] .............................................. G06F 15/18
(52) U.S. Cl. .......................... 706/41; 706/15; 706/25; 706/43
(58) Field of Search ............................. 706/41, 15, 25, 706/43

(56) References Cited

U.S. PATENT DOCUMENTS

| 5,517,600 A | 5/1996 | Shimokawa | 706/15 |
| 5,701,398 A | * 12/1997 | Glier et al. | 706/41 |
| 5,720,002 A | 2/1998 | Wang | 706/25 |
| 6,041,322 A | 3/2000 | Meng et al. | 706/43 |

FOREIGN PATENT DOCUMENTS

EP    0479102 A2    4/1992

OTHER PUBLICATIONS

Hanna et al, "A Normalised Backpropagation Learning Algorithm for Multilayer Feed–Forward Neural Adaptive Filters", IEEE Signal Processing Society Workshop, Sep. 10–12, 2001.*

Mascia et al., "Neural Net Implementation on Single–Chip Digital Signal Processor", IEEE, XP010091309 (1989).

* cited by examiner

*Primary Examiner*—George Davis
(74) *Attorney, Agent, or Firm*—Brian N. Young; Townsend and Townsend and Crew LLP

(57) ABSTRACT

A computing machine capable of performing multiple operations using a universal computing unit is provided. The universal computing unit maps an input signal to an output signal. The mapping is initiated using an instruction that includes the input signal, a weight matrix, and an activation function. Using the instruction, the universal computing unit may perform multiple operations using the same hardware configuration. The computation that is performed by the universal computing unit is determined by the weight matrix and activation function used. Accordingly, the universal computing unit does not require any programming to perform a type of computing operation because the type of operation is determined by the parameters of the instruction, specifically, the weight matrix and the activation function.

46 Claims, 6 Drawing Sheets

$$W = \begin{bmatrix} W_1^T & W_2 \end{bmatrix}$$

$$W_1 = \begin{bmatrix} W_{11}^{(1)} & W_{12}^{(1)} & \cdots & W_{1L}^{(1)} \\ W_{21}^{(1)} & W_{22}^{(1)} & \cdots & W_{2L}^{(1)} \\ \vdots & \vdots & \ddots & \vdots \\ W_{N1}^{(1)} & W_{N2}^{(1)} & \cdots & W_{NL}^{(1)} \end{bmatrix}$$

$$W_2 = \begin{bmatrix} W_{11}^{(2)} & W_{12}^{(2)} & \cdots & W_{1M}^{(2)} \\ W_{21}^{(2)} & W_{22}^{(2)} & \cdots & W_{2M}^{(2)} \\ \vdots & \vdots & \ddots & \vdots \\ W_{L1}^{(2)} & W_{L2}^{(2)} & \cdots & W_{LM}^{(2)} \end{bmatrix}$$

*FIG. 5*

IC FOR UNIVERSAL COMPUTING WITH NEAR ZERO PROGRAMMING COMPLEXITY

BACKGROUND OF THE INVENTION

The present invention generally relates to computing machines and Integrated Circuits (ICs), and more specifically to a universal computing unit capable of performing multiple operations without program instructions.

A goal of IC design methodologies is to provide both high performance in relation to low power consumption and price, and high flexibility. However, traditional IC technologies, such as Applications Specific Integrated Circuits (ASICs) and Digital Signal Processors (DSPs), do not satisfy both goals. An ASIC provides high performance with low power consumption and price, but provides very low flexibility. A DSP provides high flexibility, but provides low performance in relation to power consumption and price because a DSP requires extensive programming complexity, control, and execution instructions to perform a complete application algorithm.

An IC typically performs multiple functions, such as addition, multiplication, filtering, Fourier transforms, and Viterbi decoding processing. Units designed with specific rigid hardware have been developed to specifically solve one computation problem. For example, adder, multiplier, multiply accumulate (MAC), multiple MACs, Finite Impulse Response (FIR) filtering, Fast Fourier Transform (FFT), and Viterbi decoding units may be included in an IC. The adder unit performs additional operations. The multiplier unit performs multiplication operations. The MAC unit performs multiplication and addition operations. Multiple MACs can perform multiple multiplication and addition operations. The FIR unit performs a basic filter computation. The FFT unit performs Fast Fourier Transform computations. And, the Viterbi unit performs a maximum likelihood decoding processing.

The FIR, FFT, and Viterbi units are specially designed to perform complicated filter, transform, and decoding computations. Multiple MACs may be able to perform these operations, but performing the operations requires complicated software algorithms to complete a computation. Thus, performing the FIR filtering, FFT, and Viterbi decoding computations with multiple MACs requires an enormous amount of processing time, which restricts the operations of the IC.

All of these units are implemented in rigid hardware to obtain the best performance of the specific operations. Thus, the functions performed by the units may be performed faster by the IC because the IC includes units to specifically perform certain operations. However, if an application does not need a provided operation, the hardware for the unused operation is wasted. For example, an IC may include FIR, FFT, and Viterbi units. If an application does not need to perform a Viterbi decoding operation, the Viterbi unit is not used by the IC because the unit can only perform Viterbi operations. This results in dead silicon because the silicon used to implement Viterbi unit is wasted or not used during the execution of the application.

BRIEF SUMMARY OF THE INVENTION

In one embodiment of the present invention, a computing machine capable of performing multiple operations using a universal computing unit is provided. The universal computing unit maps an input signal to an output signal. The mapping is initiated using an instruction that includes the input signal, a weight matrix, and an activation function. Using the instruction, the universal computing unit may perform multiple operations using the same hardware configuration. The computation that is performed by the universal computing unit is determined by the weight matrix and activation function used. Accordingly, the universal computing unit does not require any programming to perform a type of computing operation because the type of operation is determined by the parameters of the instruction, specifically, the weight matrix and the activation function.

In one embodiment, the universal computing unit comprises a hardware structure that implements networked nodes that map an input signal to an output signal. The network connects nodes and the connections correspond to weights in the weight matrix. The input signal is mapped through the connections in the networked nodes using the weights of the weight matrix and the activation function to generate an output signal. The output signal that is mapped is a result of the corresponding computation that is determined by the weight matrix and activation function.

With the specification of the weight matrix, and activation function, any operation may be performed by the universal computing unit. The weight matrix and activation function used determine the operation that is performed by the universal computing unit to generate the output signal that is being mapped.

In one embodiment, a computing unit in a computing machine is provided. The computing machine performs a plurality of computing operations using the computing unit. The computing unit comprising: a hardware structure that implements networked nodes that receive an input signal and map the input signal to an output signal, wherein nodes in the networked nodes are related by a network of connections between the nodes; a weight matrix input that receives a weight matrix, wherein the weight matrix comprises weights corresponding to the connections; and an activation function input that receives an activation function, wherein the activation function specifies a function for the nodes in the network of nodes, wherein the weight matrix and activation function correspond to a computing operation, wherein the hardware structure maps the input signal though the network of connections in the networked nodes using the corresponding weights of the weight matrix for the connections and the function of the activation function to generate the output signal, the output signal being a result of the computing operation that is determined by the weight matrix and activation function.

A further understanding of the major advantages of the invention herein may be realized by reference to the remaining portions of the specification in the attached drawings.

BRIEF DESCRIPTION OF THE DRAWINGS

FIG. 5 illustrates an embodiment of a weight matrix; and

DETAILED DESCRIPTION OF THE INVENTION

Figure 1:
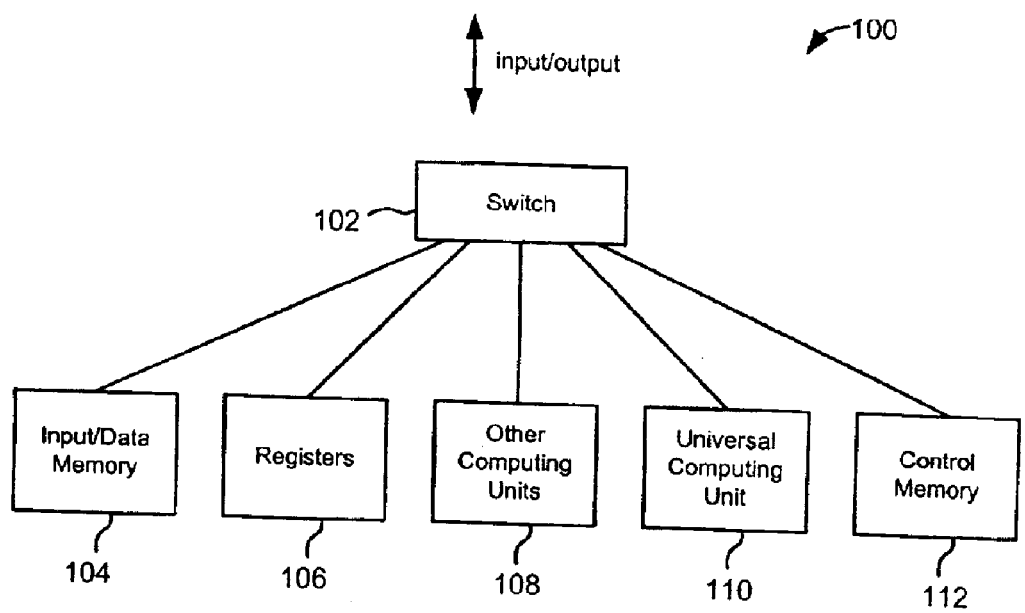
FIG. 1 illustrates an embodiment of a system for implementing an adaptable computing environment that includes a universal computing unit (UCU)

FIG. 1 illustrates an embodiment of a computing machine 100 for implementing an adaptable computing environment.

Referring FIG. 1, computing machine 100 includes a switch 102. Switch 102 connects an input data memory 104, registers 106, other computing units 108, a universal computing unit 110, and a control memory 112. It will be understood that switch 102 is used for illustrative purposes and any method of connecting units together may be used. Switch 102 can interconnect any of the units together. For example, switch 102 may connect all units together or may connect only specific units together. Typically, switch 102 receives a command indicating which units should be connected together. For example, a command with binary values corresponding to the units may be sent to input data memory 104, registers 106, other computing units 108, universal computing unit 110, and control memory 112, where a value or routing coefficient, such as "1", indicates that a unit should be switched on, and a value, such as "0", indicates that a unit should not be switched on. The routing coefficients replace a programming instruction stream by a data coefficient stream. Thus, a traditional programming bus is made obsolete by the use of routing coefficients and a traditional programming instruction stream may be replaced with a data coefficient stream. Switch 102 allows the input data to be sent to the units and subsequently receives the output data after processing by the units.

Computing machine 100 may be any Integrated Circuit (IC). Computing machine 100 can perform a plurality of computing operations using an instruction that is sent to UCU 110. The parameters of the instruction determine the type of computing operation that is performed by UCU 110.

In order to perform a computing operation, computing machine 100 may use any of the units shown in FIG. 1 and other units known in the art. For example, other computing units 108 may include adders, multipliers, and MACs to perform elementary computations. Examples of other uses are that input/data memory 104 and registers 106 may store data, such as an input signal or output signal, for UCU 110 and control memory 112 may store control instructions, such as binary control codes. The control codes may be for elementary computations and/or control parameters for UCU 110.

Figure 2:
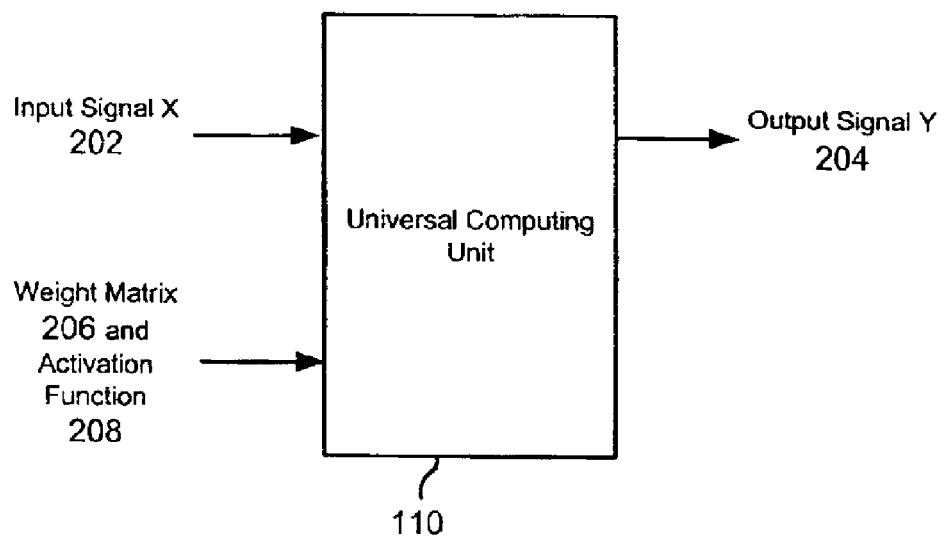
FIG. 2 illustrates an embodiment of the UCU.

FIG. 2 illustrates an embodiment of universal computing unit (UCU) 110. UCU 110 includes an input signal input to receive an input signal 202, a weight matrix input to receive a weight matrix 204, and an activation function to receive an activation function 206. Input signal 202, X, is mapped to output signal 204, Y, using weight matrix 206 and activation function 208. The matrix values and the selection of the activation function are coefficients that define the desired operation, which may be called operation-coefficients.

Input signal 202 may be any signal that includes input data. For example, input signal 202 includes digital data such as a vector of ones and zeros. Universal computing unit 110 maps input data to output data using weight matrix 206 and activation function 208.

Weight matrix 206 is a matrix of weights. In one embodiment, weight matrix 206 is a matrix of n×m dimensions. Weight matrix 206 includes coefficients that are used in calculations with input data. Weight matrix 206 will be described in more detail hereinafter.

Activation function 208 is a function applied to a result of a calculation at a node. Each node or groups of nodes of UCU 110 may have an associated activation function or a one activation function may be associated with every node. In one embodiment, activation function 208 may be of two types. The first type is a linear function, such as a unity gain function, which is mainly used for linear processing algorithms. The second function is a nonlinear function, such as a sigmoid or limiter function, which is mainly used for nonlinear processing algorithms.

Figure 3:
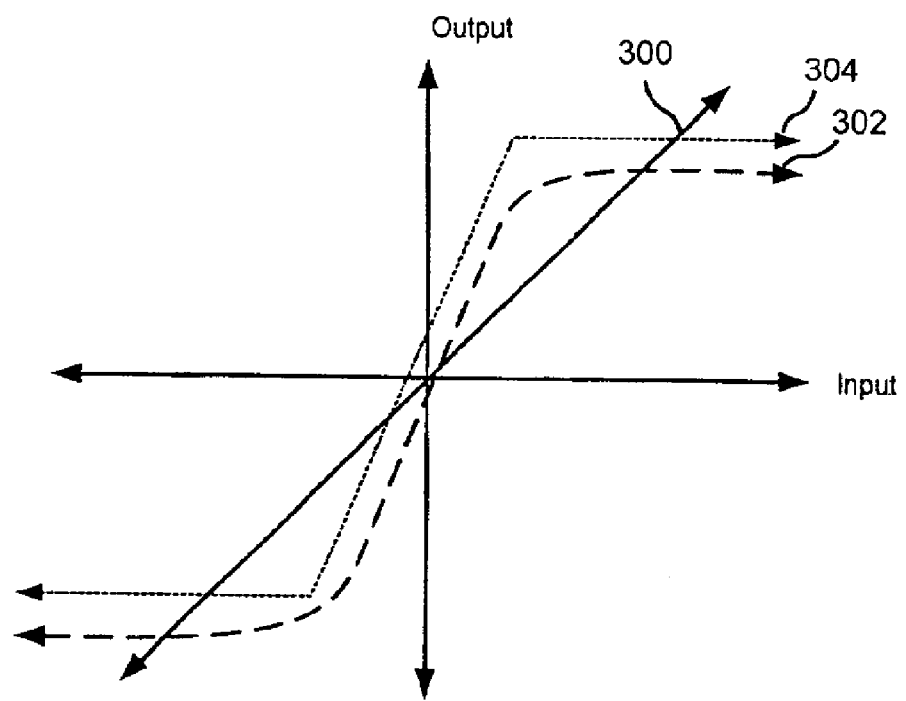
FIG. 3 illustrates an example of a unity gain function and two non-linear functions.

FIG. 3 illustrates an example of a unity gain function 300, a sigmoid function 302 and a limiter function 304. As shown, unity gain function 300 is a linear function where output increases and decreases linearly with input. Sigmoid function 302 is a nonlinear function where output increases and decreases non-linearly with input. Limiter function 304 is a nonlinear function output increases and decreases non-linearly with input. Other non-linear functions known in the art may also be used as activation function 208.

In one embodiment, UCU 110 includes a hardware structure that implements one or more nodes connected by a network that map input signal 202 to output signal 204 using weight matrix 206 and activation function 208. In one embodiment, the nodes may be organized in layers and form a multi-layer perceptron network. For example, a three layer network is used to map input signal 202 to output signal 204. In one embodiment, multi-layer perceptron networks may be used as described in "Applied Neural Networks for Signal Processing", Fa-Long Luo and Rolf Unbehauen, University Press, 2000, which is herein incorporated by reference for all purposes. Although three layers are used for discussion purposes, it will be understood that any number of layers may be used in the network.

Figure 4:
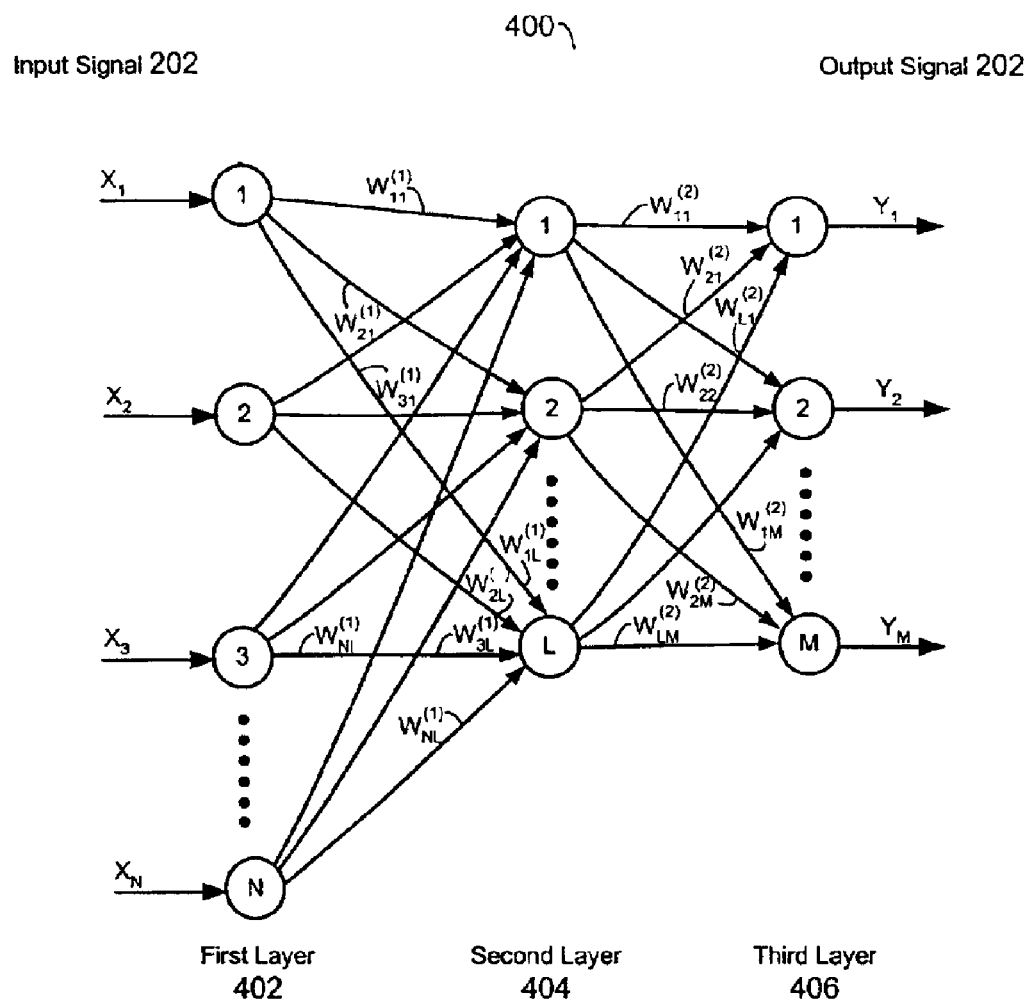
FIG. 4 illustrates an embodiment of networked nodes for the UCU.

FIG. 4 illustrates an embodiment of networked nodes 400 for UCU 110. As shown, networked nodes 400 includes three layers. First layer 402 receives input signal 202 in the form of a vector of N dimensions, $X=[X_1, X_2, X_3, \ldots, X_N]$. In one embodiment, networked nodes 400 operates as a multi-layer perceptron network. Each layer may include any number of nodes. For example, the nodes of first layer 402 are represented by 1-N, the nodes of second layer 404 are represented by 1-L, and the nodes of third layer 406 are represented by 1-M.

As shown, networked nodes 400 includes connections between each layer. Data flows through the connections of networked nodes 400 from left to right. The connections are represented as $W_{nx}^{(i)}$, where "x" is the index of the node at the ending point (right side) of the connection, "n" is the index of the node at the source point (left side) of the connection, and "i" is the index for the related layers using the corresponding source layer. The connections are shown connecting first layer 402 and second layer 404, and the second layer 404 and third layer 406. However, nodes may be connected in other ways.

Each connection between layers has a corresponding weight coefficient in weight matrix 206. FIG. 5 illustrates an embodiment of weight matrix 206, W that may be used for networked nodes 400. Weight matrix 206 includes two sub-matrices $W_1$ and $W_2$. $W_1$ is the weight matrix for connections between first layer 402 and second layer 404; and $W_2$ is the weight matrix for connections between second layer 404 and third layer 406. Any number of sub-matrices may be used and additional sub-matrices may be used if additional layers are included in networked nodes 400. As shown, each weight corresponds to a connection in networked nodes 400. For example, weight $W_{12}^{(1)}$ in matrix $W_1$ is the weight for the connection between the second node of second layer 404 and the first node of first layer 402. In one embodiment, the connections for a node are found by taking a column of one of the matrices. For example, the first column of matrix $W_1$ includes the connections for the first node of second layer 404, the second column for the second node of second layer 404, etc.

Referring back to FIG. 4, the N dimensions of input signal 202 are fed into the nodes of first layer 402 and the values of second layer 404 are then processed. In one embodiment, the value of a node in a layer is the dot product of the weights of the connections to the node and the corresponding values of the connected nodes in the prior layer. Thus, the dot product of each node of second layer 404 is determined by the dot product of the weights of the connections and the corresponding values of the connected nodes in first layer 402. In this example, the dot product of the nodes of second layer 404 may be represented as:

$$X^{(1)}(j) = \sum_{i=1}^{N} W_{ij}^{(1)} X_i.$$

$X^{(1)}(j)$ is the dot product of all connections to the j'th node in second layer 404. $W_{ij}^{(1)}$ represents the weights for the connections to the j'th node of second layer 404, and $X_i$ represents the values of the connected nodes.

Once the dot product of the connections is determined, the activation function is applied to the result to produce the output of the node. If the activation function is represented as F( ), the output of the node may be represented as:

$$Y^{(1)}(j) = F(\sum_{i=1}^{N} W_{ij}^{(1)} X_i).$$

The output of the node is then used in the processing between second layer 404 and third layer 406. The processing is similar to second layer 404 processing but third layer 406 processing uses the matrix $W_2$.

The nodes in third layer 406 perform the computation of:

$$X^{(2)}(j) = \sum_{i=1}^{L} W_{ij}^{(2)} Y^{(1)}(i).$$

$X^{(2)}(j)$ is the dot product of all connections to the j'th nodes in third layer 406. $W_{ij}^{(2)}$ represents the weights for the connections for the j'th nodes of third layer 406, and $Y^{(1)}(i)$ represents the values of the connected nodes originating from second layer 404.

Once the dot products of the connections are determined, the activation function is applied to the result to produce the output of the node. If the activation function is represented as F( ), the output of the node may be represented as:

$$Y^{(2)}(j) = F(\sum_{i=1}^{L} W_{ij}^{(2)} Y^{(1)}(i)).$$

The output $Y_j$ (at the j'th node) of third layer 406 then constitutes output signal 204, which may be represented as:

$$Y_j = Y^{(2)}(j) = F(\sum_{i=1}^{L} W_{ij}^{(2)} Y^{(1)}(i))$$

UCU 110 is configured to perform multiple computations by receiving a single instruction. The single instruction may be represented as Y=UCU(X, W, S), where Y is output signal 204, X is input signal 202, W is weight matrix 206, and S is the type of the activation function 208. Once UCU 110 receives parameters X, W, and S, the output is mapped by UCU 110. The mapped output is the result of a specific computation, such as Discrete Fourier Transforms (DFTs), FIR filtering, or Viterbi decoding processing. However, the type of computation is not explicitly specified to UCU 110. Rather, the type of computation performed by UCU 110 is controlled by the parameters W and S that are included in the instruction. Weight matrix 206 is configured with different coefficients for different computations. Thus, different computations may be performed by UCU 110 by changing the weights of weight matrix 206 and activation function 208. No programming is required to change operations, data is fed through UCU 110 and the values of weight matrix 206 and activation function 208 determine the output of UCU 110. Thus, the specific computation associated with weight matrix 206 and activation function 208 is performed by mapping. Accordingly, UCU 110 is adaptable to perform multiple operations using the same instruction with different weights and activation functions as parameters. Alternatively, UCU 110 may receive an instruction including the parameters W and S and use the parameters to map input signals or an input stream to output signals or an output stream.

Examples of different operations that may be performed by UCU 110 will now be described. Although the following operations are described, a person skilled in the art will understand that UCU 110 may perform any desired linear or non-linear operation by mapping input data to output data.

According to definition, the DFT of an input signal X is: Y=FX, where F is a known transform matrix. The instruction, Y=UCU (X, W, S), is used to perform a DFT computation using UCU 110. Weight matrix 206 is represented by the known transform matrix, F, as a weight matrix, $W_1$, between first layer 402 and second layer 404 and an identity matrix, I, as the weight matrix, $W_2$, between second layer 404 and third layer 406. An identity matrix is a matrix whose diagonal elements are unity and the rest are zeros. The activation function is also a unity gain function and represented by S=0. Accordingly, the instruction sent to UCU 110 to perform a DFT function is: Y=UCU (X, [F, I], 0). Using the instruction, UCU 110 performs a DFT computation by mapping input signal X through connections between networked nodes 400 to generate the desired output signal Y.

UCU 110 may also perform FIR filtering computations. By definition, the FIR filter output of an input signal X is:

$$y(n) = \sum_{m=0}^{l} a(m)x(n-m),$$

where x(n−m), y(n), and a(m) are the input, output, and filter coefficients, respectively. This FIR processing may be performed by UCU 110 using the instruction: Y=UCU (X, W, S)=UCU (X, [A, I], 0), where A is a matrix comprising the filter coefficients, X is the input vector, and Y is the output vector. The matrix, $W_1$, between first layer 402 and second layer 404 is A. The matrix, $W_2$, between second layer 404 and third layer 406 is the identity matrix. The activation function (S=0) is the unity gain function. Using the above instruction, UCU 110 performs an FIR filtering for input signal X to produce output signal Y. The input signal is mapped through connections in networked nodes 400 using the weight matrix and activation function to generate the output signal.

UCU 110 may also perform nonlinear computations. For example, pattern classifications expressed as Y=G(X) are performed. The function G(X) is approximated by UCU 110 by mapping input signals to output signals. In order to perform a nonlinear computation, activation function 208 is set to a nonlinear setting (S=1), and a sigmoid function is used. Thus, the instruction Y=UCU(X, W, 1) is used to perform pattern classifications.

In one embodiment, the weight matrix W may be determined by offline learning algorithms that approximate the above mapping of the function G( ). To determine weight matrix W, a training stage or preprocessing stage is performed where weights are set to produce the desired output. For example, an input is fed into networked nodes 400 with an initial weight matrix of weights. Then, it is determined if the output of networked nodes 400 is the desired mapping of the input signal for the pattern classification. If so, the weights of weight matrix W are acceptable. This process is repeated for multiple inputs and the weights are adjusted until all inputs are mapped to their desired outputs with a substantial degree of accuracy. The weights of the final weight matrix are used in weight matrix W for the specific pattern classification. Once the weights are set for a classification, the classification is performed by using the above instruction with the weight matrix W that was determined in the learning phase of the preprocessing.

Using the instruction Y=UCU(X, W, 1), with the determined weight matrix W for the pattern classification that is to be performed, UCU 110 maps an input signal X to the desired output signal Y. Thus, any non-linear function may be mapped using UCU 110. The desired output signal for an input signal is mapped through connections of networked nodes 400 using the weight matrix and activation function.

Figure 6:
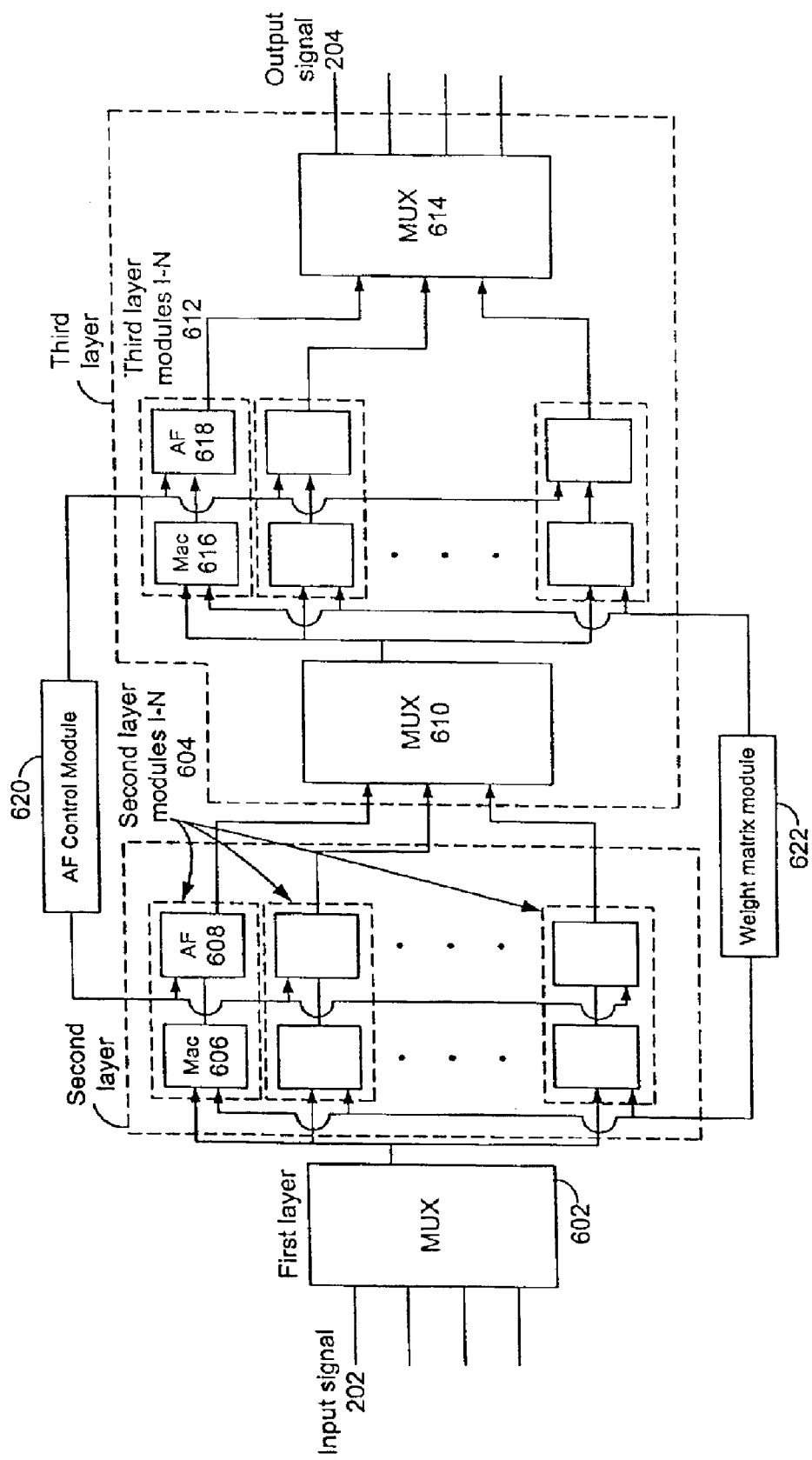
FIG. 6 illustrates an embodiment of a hardware implementation of the UCU.

FIG. 6 illustrates an embodiment of a hardware implementation 600 of UCU 110 that implements networked nodes 400 for mapping input signal 202 to output signal 204. Hardware implementation 600 includes a first layer, second layer, and third layer. The first, second, and third layers correspond to first layer 402, second layer 404, and third layer 406 of FIG. 4, respectively.

Hardware implementation 600 also includes a weight matrix module 622 and activation function (AF) control module 620. Weight matrix module 622 includes one or more weight matrices. The weight matrices correspond to the different computations that UCU 110 may perform. Weight matrix module 622 is configured to send the appropriate weights to nodes in the second and third layers.

AF control module 620 includes one or more activation functions. AF control module 620 is configured to send a command to nodes in the second and third layers indicating the type of activation function to apply.

The first layer includes a multiplexer (MUX) 602. MUX 602 receives input signal 202 of N dimensions and sends the appropriate values, $X_1 \ldots X_N$, of input signal 202 to modules 604 of the second layer. The appropriate vector values are determined by the connections between nodes as shown in FIG. 4. For example, every node in second layer 404 receives all the values of the nodes in first layer 402. Thus, MUX 602 sends every vector value of input signal 202 to each module 604. Although a multiplexer is used as the first layer, a person skilled in the art will recognize other ways of implementing a first layer.

The second layer includes one or more second layer modules 604. A module 604 includes, in one embodiment, a multiply-accumulate unit (MAC) 606 and an activation function unit (AF) 608. Each MAC 606 (the index is "j") performs the computation of:

$$X^{(1)}(j) = \sum_{i=1}^{N} W_{ij}^{(1)} X_i,$$

where j is the index of MAC 606 for this layer.

Each MAC 606 receives values of input signal 202 and the corresponding weights from weight matrix module 622 for the connections. The computation is then performed and passed to AF 608. AF control 620 provides an instruction, such as a "0" or "1" to each AF 608 that determines whether a unity gain function or sigmoid function should be applied by AF 608. AF 608 (the corresponding index is "j") then performs the computation of:

$$Y^{(1)}(j) = F(X^{(1)}(j)) = F(\sum_{i=1}^{N} W_{ij}^{(1)} X_i),$$

as described above. If S=0, the above equation may be simplified to:

$$Y^{(1)}(j) = X^{(1)}(j) = \sum_{i=1}^{N} W_{ij}^{(1)} X_i.$$

Each second layer module 604 corresponds to a node in second layer 404 as described in FIG. 4. Although one or more second layer modules 604 are used as the second layer, a person skilled in the art will recognize other ways of implementing a second layer. For example, any number of MAC 606 and AF 608 units may be used. Additionally, a structure including a single multiply-accumulate unit, such as an FIR filter, combined with an activation function unit, such as AF 608, may be used to implement the second layer. However, if these structures are used, the computation may take longer because the structures do not include a separate unit for each node. Thus, the computation for each node has to be cycled through the structure multiple times using software algorithms.

The third layer includes a MUX 610 and one or more third layer modules 612. Additionally, a MUX 614 may be included for sending output signal 204. Similarly to second layer modules 604, a third layer module 612 will also include a multiply-accumulate unit, MAC 616, and an activation function unit, AF 618. The third layer operates in a similar manner as the second layer. The resulting values from the second layer are sent to MUX 610, which then sends the appropriate values to third layer modules 612 based on the connections shown between second layer 404 and third layer 406 in FIG. 4. Third layer modules 612 also receive weights from weight matrix module 622. The weight matrix is typically the matrix for the connections between the second and third layer. Also, an activation function from AF 620 is received.

The computations in third layer modules 612 proceeds as described above with regards to second layer modules 604. Each MAC 616 performs the computation of:

$$X^{(2)}(j) = \sum_{i=1}^{L} W_{ij}^{(2)} Y^{(1)}(i),$$

where "j" is the index of MAC 616 in this layer. Each MAC 616 receives values $Y^{(1)}$ (i) from the second layer through MUX 610 and the corresponding weights $W_{ij}^{(2)}$ from weight matrix module 622. The computation is then performed in MAC 616 and passed to AF 618. AF control 620 provides an instruction, such as a "0" or "1" to each AF 618 that determines whether a unity gain function or sigmoid function should be applied by AF 618. AF 618 performs the computation of:

$$Y_j = Y^{(2)}(j) = F(X^{(2)}(j)) = F(\sum_{i=1}^{L} W_{ij}^{(2)} Y^{(1)}(i)),$$

as described above.

Each module 612 corresponds to a node in third layer 406 of FIG. 4. Although one or more third layer modules 612 are used as the third layer, a person of skill in the art will appreciate other ways of implementing a third layer. For example, similar to the second layer, any number of MAC 616 and AF 618 units may be used. Additionally, a structure including a single multiply-accumulate unit, such as an FIR filter, combined with activation function unit, such as AF 618, may be used to implement the third layer. However, if these structures are used, the computation may take longer because the structures do not include a separate unit for each node. Thus, the computation for each node has to be cycled through the structure multiple times using software algorithms. Additionally, in another embodiment, the same module used in the second layer may be used in the third layer.

The output of third layer modules 612 is sent to MUX 614, which outputs the mapped output signal 204. Thus, input signal 202 has been mapped to output signal 204 using hardware implementation 600. Although MUX 614 is used for outputting output signal 204, a person of skill in the art will appreciate other ways of outputting output signal 204. For example, output signal 204 may be directly passed from third layer modules 612. Additionally, other hardware implementations may be used to implement UCU 110. For example, any hardware structure that can implement networked nodes 400 and map an input signal to an output signal using weight matrix 206 and activation function 208 may be used.

Accordingly, computing machine 100 can perform a plurality of computing operations using single instruction that is sent to UCU 110. Typically, computing operations, such as DFT, FIR filtering, and pattern classifications computations, require multiple programming instructions to perform a computation. However, UCU 110 requires the specification of operation-coefficients to map input data to output data, where the output data is a result of a computing operation defined by the operation-coefficients. Thus, the operations-coefficients replace a programming instruction stream with a data coefficient instruction stream. The parameters of the instruction determine the type of computing operation that is performed by UCU 110. Thus, universal computing unit 110 does not require programming instructions to perform different types of computing operation because the type of operation is controlled by the weight matrix and activation function. Programming instructions are replaced by the weight matrix and an instruction set is simplified to a "stop" and "go" instruction for UCU 110. The parameters of the weight matrix and activation are specified and input data is streamed through UCU 110 to produce output data. Thus, a programming bus is not needed and becomes obsolete.

The above description is illustrative but not restrictive. Many variations of the invention will become apparent to those skilled in the art upon review of this disclosure. The scope of the invention should, therefore, be determined not with reference to the above description, but instead should be determined with reference to the pending claims along with their full scope or equivalents.

What is claimed is:

1. A computing unit in a computing machine, wherein the computing machine performs a plurality of computing operations using the computing unit, the computing unit comprising:
  a hardware structure that implements networked nodes that receive an input signal and map the input signal to an output signal, wherein nodes in the networked nodes are related by a network of connections between the nodes;
  a weight matrix input that receives a weight matrix, wherein the weight matrix comprises weights corresponding to the connections; and
  an activation function input that receives an activation function, wherein the activation function specifies a function for the nodes in the network of nodes,
  wherein the weight matrix and activation function correspond to a computing operation, wherein the hardware structure maps the input signal though the network of connections in the networked nodes using the corresponding weights of the weight matrix for the connections and the function of the activation function to generate the output signal, the output signal being a result of the computing operation that is determined by the weight matrix and activation function.

2. The computing unit of claim 1, wherein the networked nodes are arranged in a plurality of layers.

3. The computing unit of claim 1, wherein the networked nodes form a multi-layer perceptron network.

4. The computing unit of claim 1, wherein the weight matrix comprises a plurality of sub-matrices.

5. The computing unit of claim 1, wherein the function of the activation function comprises a linear function.

6. The computing unit of claim 5, wherein the linear function comprises a unity gain function.

7. The computing unit of claim 1, wherein the function of the activation function comprises a nonlinear function.

8. The computing unit of claim 7, wherein the nonlinear function comprises a sigmoid function.

9. The computing unit of claim 7, wherein the nonlinear function comprises a limiter function.

10. The computing unit of claim 1, wherein the computing machine comprises an integrated circuit.

11. The computing unit of claim 1, wherein the hardware structure comprises one or more units capable of performing multiplication and accumulation operations and one or more activation function units.

12. A computing unit in a computing machine, wherein the computing machine performs a plurality of computing operations using the computing unit, the computing unit comprising:
  an input layer of nodes for receiving an input signal;
  a middle layer of nodes coupled to the input layer of nodes, wherein the middle layer of nodes are related to the input layer of nodes through a first network of connections, the middle layer configured to process the input signal using middle layer weights corresponding to the first network of connections and an activation function to generate a middle layer signal; and
  an output layer of nodes coupled to the middle layer of nodes, wherein the output layer of nodes are related to the middle layer of nodes through a second network of connections, the output layer configured to process the middle layer signal using output layer weights corresponding to the second network of connections and the activation function to generate an output signal, the output signal being a result of a computing operation corresponding to the middle and output layer weights and the activation function.

13. The computing unit of claim 12, wherein the input, middle, and output layers are constructed into a multi-layer perceptron network.

14. The computing unit of claim 12, wherein the input layer of nodes is a multiplexer.

15. The computing unit of claim 12, wherein a node in the middle layer of nodes comprises one or more units capable of performing multiply and accumulate operations and one or more activation function units.

16. The computing unit of claim 15, wherein one or more units capable of performing multiply and accumulate operations comprise multiply-accumulate units.

17. The computing unit of claim 12, wherein a node in the output layer of nodes comprises one or more units capable of performing multiplication and accumulation operations and one or more activation function units.

18. The computing unit of claim 17, wherein one or more units capable of performing multiplication and accumulation operations comprise multiply-accumulate units.

19. The computing unit of claim 12, wherein the activation function comprises a linear function.

20. The computing unit of claim 19, wherein the linear function comprises a unity gain function.

21. The computing unit of claim 12, wherein the activation function comprises a nonlinear function.

22. The computing unit of claim 21, wherein the nonlinear function comprises a sigmoid function.

23. The computing unit of claim 21, wherein the nonlinear function comprises a limiter function.

24. The computing unit of claim 12, further comprising a weight matrix, wherein the weight matrix comprises the middle layer and output layer weights.

25. The computing unit of claim 12, wherein a node in the middle layer is configured to process the input signal using middle layer weights by computing a dot product of the middle layer weights and input signal for the connection to the node.

26. The computing unit of claim 25, wherein the node in the middle layer is configured to process the dot product by applying the activation function to the dot product.

27. The computing unit of claim 12, wherein a node in the output layer is configured to process the middle layer signal using the output layer weights by computing a dot product of the output layer weights and middle layer signal for the connections to the node.

28. The computing unit of claim 27, wherein the node in the output layer is configured to process the dot product by applying the activation function to the dot product.

29. The computing unit of claim 12, wherein the weights determine the connection of nodes.

30. The computing unit of claim 12, wherein the computing machine comprises an integrated circuit.

31. A method for performing a plurality of computing operations with a computing unit using a weight matrix and an activation function, the computing unit comprising a hardware structure that implements networked nodes, wherein nodes in the networked nodes are related by a network of connections between the nodes, wherein the weight matrix comprises weights corresponding to the connections and the activation function specifies a function for the nodes in the networked nodes, the method comprising:
receiving an instruction that is applied to an input signal at the computing unit, wherein the instruction includes the weight matrix and the activation function, the weight matrix and activation function corresponding to a computing operation; and
mapping the input signal through the network of connections in the networked nodes using the corresponding weights of the weight matrix for the connections and function of the activation function for the nodes to generate an output signal, wherein the output signal is a result of the computing operation determined by the weight matrix and activation function.

32. The method of claim 31, wherein the networked nodes form a multi-layer perceptron network.

33. The method of claim 32, wherein the multi-layer perceptron network is a three layer perceptron network.

34. The method of claim 32, wherein mapping the input signal through the network of connections in the networked nodes using the corresponding weights of the weight matrix for the connections comprises computing a dot product for a node, wherein the dot product is a computation of values of nodes connected to the node and the corresponding weights for the connections to the node.

35. A method for performing a plurality of computing operations with a computing unit using a weight matrix and an activation function, the computing unit comprising a hardware structure that implements networked nodes, wherein nodes in the networked nodes are related by a network of connections between the nodes, wherein the weight matrix comprises weights corresponding to the connections and the activation function specifies a function for the nodes in the networked nodes, the method comprising:
receiving an input signal at an input layer in the networked nodes;
sending the input signal to one or more nodes in a middle layer that are related by connections with the input layer;
receiving middle layer weights for the connections between the input layer and middle layer from the weight matrix;
processing the input signal using the middle layer weights and the function of the activation function to generate a middle layer signal;
sending the middle layer signal to one or more nodes in an output layer that are related by connections with the middle layer;
receiving output layer weights for the connections between the middle layer and output layer from the weight matrix; and
generating an output signal by processing the middle layer signal using the weights and the function of the activation function.

36. The method of claim 35, wherein processing the input signal using the middle layer weights comprises computing a dot product for a node, wherein the dot product is between values of nodes connected to the node and middle layer weights for the connections to the node.

37. The method of claim 36, wherein processing the input signal using the function of the activation function comprises computing the function of the dot product.

38. The method of claim 35, wherein processing the middle layer signal using the middle layer weights comprises computing a dot product for a node, wherein the dot product is between the middle layer signal and output layer weights for the connections to the node.

39. The method of claim 38, wherein processing the middle layer signal using the function of the activation function comprises computing the function of dot product.

40. A universal computing unit in a computing machine, wherein the computing machine maps an input signal to an output signal using the universal computing unit, the universal computing unit comprising:

a first layer configured to receive the input signal;

a second layer coupled to the first layer, the second layer comprising one or more multiply-accumulate (MAC) units and one or more activation function modules, wherein the one or more MAC units are configured to receive the input signal and second layer weights from a weight matrix and calculate one or more dot products of the received second layer weights and input signal, wherein the one or more activation function modules are configured to calculate a function of the one or more dot products of the received second layer weights and input signal to generate a second layer signal; and a third layer coupled to the second layer, the third layer comprising one or more MAC units and one or more activation function modules, wherein the one or more MAC units are configured to receive the second layer signal and third layer weights from the weight matrix and calculate one or more dot product of the received third layer weights and second layer signal, wherein the one or more activation function modules are configured to calculate a function of the one or more dot products of the received third layer weights and second layer signal to generate the output signal.

41. The universal computing unit of claim 40, further comprising a weight matrix module configured to send the second and third layer weights to the one or more MAC units of the second and third layers.

42. The universal computing unit of claim 40, further comprising an activation function module configured to send the function to the one or more activation function modules.

43. The universal computing unit of claim 40, wherein the first layer comprises a multiplexer.

44. The universal computing unit of claim 40, wherein the second layer comprises a multiplexer configured to receive the second layer signal and send the second layer signal to the one or more MACs of the third layer.

45. The universal computing unit of claim 40, wherein the third layer comprises a multiplexer configured to provide the output signal.

46. A method for performing a plurality of computing operations with one or more universal computing units, the one or more universal computing units being part of a network that couples the one or more universal computing units to one or more computing units, the method comprising:

receiving routing coefficients that specify connectivity information for the one or more universal computing units and one or more computing units in the network, wherein the routing coefficients replace a programming instruction stream by a data coefficient stream;

connecting the one or more universal computing units and one or more computing units in the network based on the routing coefficients;

receiving an instruction through the connected network comprising a weight matrix and a selection of an activation function, wherein the weight matrix and selection of the activation function comprise a set of operation-coefficients that define a desired computing operation in the plurality of computing operations;

receiving an input data stream through the connected network; and mapping an output data stream for the input data stream using the connected one or more universal computing units and one or more computing units and the set of operation-coefficients, the output data stream being a result of the defined desired computing operation.

* * * * *